(No Model.)

C. W. McGREGOR & L. H. CORDRY.
MOTOR.

No. 313,222. Patented Mar. 3, 1885.

WITNESSES:
Wm C. Richmond
Chas E. Metz

INVENTORS:
Charles W. McGregor and
Lorenzo H. Cordry
per Chas F. Meisner
Atty.

United States Patent Office.

CHARLES W. McGREGOR AND LORENZO H. CORDRY, OF ST. LOUIS, MISSOURI; SAID McGREGOR ASSIGNOR TO SAID CORDRY.

MOTOR.

SPECIFICATION forming part of Letters Patent No. 313,222, dated March 3, 188 .

Application filed August 4, 1884. (No model.)

*To all whom it may concern:*

Be it known that we, CHARLES W. MC-GREGOR and LORENZO H. CORDRY, both residing in the city of St. Louis and State of Missouri, have invented a new and useful Improved Motor, of which the following is a specification.

The object of our invention is to make a motor running by means of a weight as its power, (although springs may be used, if desired, instead of the weight,) for operating light machinery, such as sewing-machines, churns, feed-cutters, &c., but especially adaptable to pumps such as are used by farmers for watering their stock, and so as to keep up a continuous supply during the day, it being designed to make the motor of sufficient power to run from twenty to twenty-four hours after being wound up before necessitating a rewinding.

To more fully describe our invention, and so as to enable others to better understand the construction and operation of the motor, reference is had to the accompanying drawings, in which—

Figure 1:
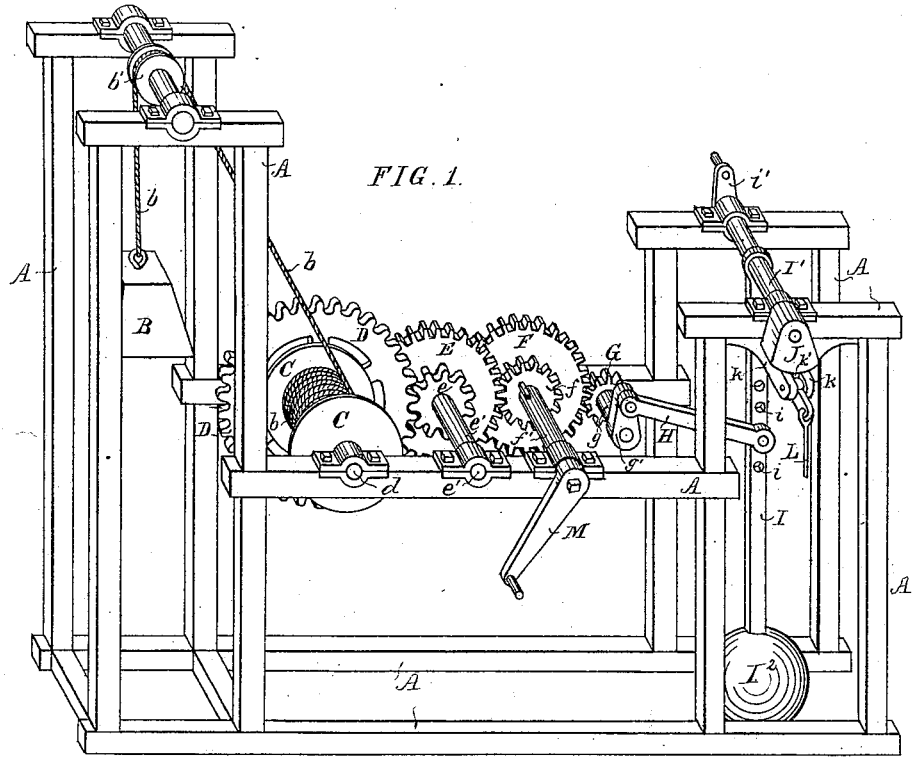
Figure 2:
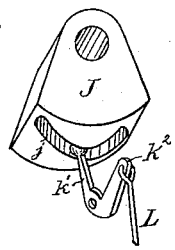

Figure 1 is a perspective view of the motor complete, showing its connection with a pump-rod. Fig. 2 is an enlarged perspective view of a cam, with a crank-lever used in connection with our motor for operating the pump-rod.

A, Fig. 1, is the frame.

B is the weight, suspended by a rope or cable, $b$, which is passed over a pulley, $b'$, in the top of the frame, and thence around and fastened to the drum C. The frame, where the weight is suspended, may be raised up to any height to suit the required length of time the machine shall be run.

D E F, &c., is a train of gearing, which may be reduced or multiplied, as desired, D being a large gear-wheel on the same shaft, $d$, to which the drum C is keyed. This large gear-wheel meshes with the pinion $e$ of the shaft $e'$, to which the gear-wheel E is keyed, and this latter meshes with the pinion $f$ of the shaft $f'$, to which the gear-wheel F is keyed. This train of gearing is not new, and may be multiplied or diminished, if desired. This train of gearing is all journaled in proper bearings on top of the frame A, and wound up by means of a crank, M, which is slipped on the shaft $f'$. Any suitable clutch device may be used for throwing out of or into engagement the gear F and pinion G. The last-mentioned gear-wheel, F, we now mesh with a pinion, G, journaled to one side of the frame a little below the line on which the train of gearing just described is journaled. To the shaft $g$ of this pinion G is keyed a crank, $g'$, which is connected by a pitman, H, to a pendulum, I. This pendulum I we key to a shaft, I', on which it swings. This shaft I' is journaled in the frame A, as shown in Fig. 1, and may be journaled on line with the gearing or above it, as desired, to suit the length of the pendulum, the drawings showing it journaled above the line of gearing. The pendulum is provided with a number of holes, $i\ i$, for connecting the pitman I, and they serve to regulate or change the pendulum, to adapt it to the various strokes of different pumps.

$I^2$ is a weight attached to the lower end of the pendulum, and is made sufficiently large so that the motive power of the motor is transferred to the pendulum, and by this means the power is directly applied to the pump or other machine. This increased weight added to the pendulum, after it is set in motion, by its momentum, regulates and controls the motor, and causes it to work in uniform and steady motion, at the same time losing none of its power, as is the case in motors where an escapement is used.

To the shaft I', from which the pendulum is suspended, we key a cam, J. This cam is provided with a groove, $j$, of the U shape shown in Fig. 2. A crank-lever journaled or fulcrumed in the bracket $k$, has one of its arms, $k'$, extending into this U-groove $j$, and may be provided with a roller or ball-head to lessen its friction while moving in said groove, while to the other arm, $k^2$, is attached the rod L of the pump.

The object of the cam, with its groove $j$ and the crank-lever, is to give to the pump-rod a lifting and a dropping motion at every half-swing of the pendulum, the operation of which is as follows: When the motor is at rest and the pendulum is in plumb position, as shown in Fig. 1, the cam is also in plumb-line, (see Fig. 1,) and the arm $k'$ of the crank-lever is in the middle of the groove, and the crank-arm $k^2$ is in raised position, as shown in Fig. 2, thereby holding the pump-rod up in raised position. Now, as the motor is set in motion the pendulum rises and swings to one side, bringing the cam up with it to the same side, thereby pushing the crank-arm $k'$ forward in the groove and lowering the arm $k^2$, allowing the pump-rod to descend into the pump, thus requiring but little power on part of the motor through means of the weight of the pump-rod, which, in fact, assists the movement of the pendulum in its upward movement. As, now, the pendulum returns by its weight to regain its plumb position, the increased power given it by the motor easily raises the pump-rod, with the water, and the crank-arm $k'$ moves back to original position in the groove of the cam. As soon as the pendulum now passes its plumb-line and ascends to the other side, the arm $k'$ moves to the other end of the groove, and is pushed forward again by the combined weight of the pump-rod, momentum of the pendulum, and power of the motor, and as the pendulum returns again to plumb-line the pump-rod is again raised and the water brought up with it, as before. Thus at each swing of the pendulum to the right and left and back the pump is caused to discharge water twice, and the pump-rod is twice lowered and raised. It will be seen that by this means of using a cam in connection with a heavily-weighted pendulum, giving the pump-rod two up and down strokes, a great saving of power is accomplished in the manner just described, the pendulum at the same time acting as a governor for regulating the motion of the motor. If desired, an ordinary crank, $i'$, may be directly attached to one or both ends of the shaft $I'$ of the pendulum, and the cam J and crank-lever dispensed with; or several cranks may be used to operate several pumps.

What we claim is—

1. In combination with a train of gearing, D E F, &c., operated by a weight or equivalents, the pendulum I, having a large weight, $I^2$, and operated by said train of gearing through means of the pinion G on the shaft $g$, crank $g'$, and pitman H, the whole contained in a suitable frame, A, as herein shown and described, and for the purpose set forth.

2. In a motor, the train of gearing D E F, &c., operated by a weight or equivalents, in combination with a pendulum, I, having weight $I^2$, holes $i\ i$, a crank, $g'$, attached to the shaft $g$, pitman H, and pinion G, said pendulum being swung from a shaft, I, to which is attached one or more cranks for operating one or more pumps or like machines, all as herein shown and described.

3. In combination with a train of gearing operated by weight or equivalents, the pendulum I, having its shaft provided with a cam, J, having U-shaped groove $j$, and the crank-lever $k'\ k^2$, for connecting with a pump-rod, &c., as herein shown and described, the whole to form a new and improved motor, as set forth.

CHARLES W. McGREGOR.
LORENZO H. CORDRY.

Witnesses:
CHAS. F. MEISNER,
CHAS. E. METZ.